May 30, 1972 — R. T. PRICE — 3,666,421
DIAGNOSTIC TEST SLIDE
Filed April 5, 1971 — 2 Sheets-Sheet 1

INVENTOR
RICHARD T. PRICE
BY Hugo E. Weisberger
ATTORNEY

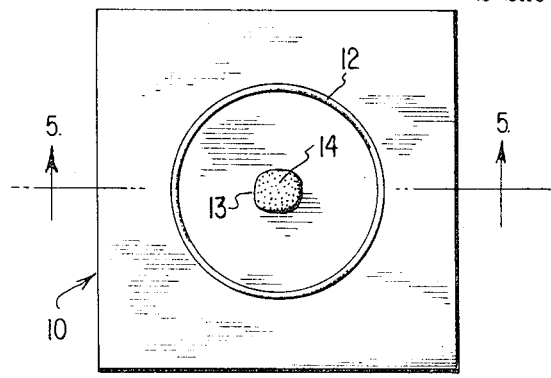
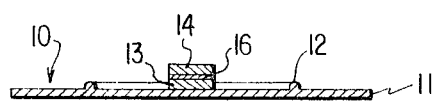
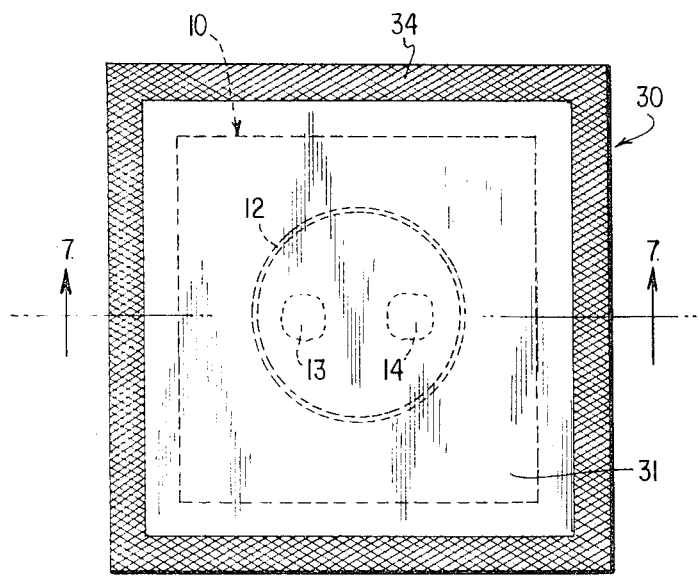
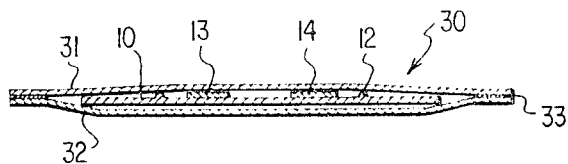

United States Patent Office 3,666,421
Patented May 30, 1972

3,666,421
DIAGNOSTIC TEST SLIDE
Richard Thompson Price, Verona, N.J., assignor to Organon, Inc., West Orange, N.J.
Continuation-in-part of abandoned application Ser. No. 818,366, Apr. 22, 1969. This application Apr. 5, 1971, Ser. No. 131,172
Int. Cl. G01n 33/16
U.S. Cl. 23—253 TP
20 Claims

ABSTRACT OF THE DISCLOSURE

A test slide for the performance and observation of an immunochemical or diagnostic test on its surface, which surface is insoluble in, impermeable to, non-absorbent to, and wettable by, water, carries on the surface at least one circumscribed test area containing in close proximity at least two deposited solid dried immunochemical reagents providing an accurate predetermined amount of an antigen and an antibody, which upon moistening with a liquid to be tested are reconstituted to the test reagents and then united to form a spot of reaction mixture.

CROSS-REFERENCE TO RELATED APPLICATION

This application is a continuation-in-part of application Ser. No. 818,366, filed Apr. 22, 1969 and now abandoned.

BACKGROUND OF THE INVENTION

The test slides of the present invention are adapted for the performance of immunochemical reactions on the surface thereof. These immunochemical reactions are most commonly laboratory tests which have as their objective the determination of the presence or absence of antigens or antibodies in body fluids as an aid in the diagnosis of certain physiological or pathological conditions in humans and animals. Depending upon the particular combination of reagents and test liquid employed, the reaction may result in the formation of a precipitate in which case it is known as a precipitin reaction. Where the reaction is between substances distributed in a liquid medium, at least one of which substances is a solid which becomes agglomerated, the reaction is known as an agglutination reaction. The formation of precipitates, or the agglutination or inhibition of agglutination of specially-treated particles is manifested visually in the way the precipitates form, or the particles arrange themselves following the reaction.

These immunochemical tests, which may include, for example, tests for blood group type, pregnancy, and similar phenomena, are customarily performed with reagents such as, for example, a suspension of sensitized erythrocytes, and a solution of a suitable antiserum, dispensed into a test vial from a dropper. Even though the test reagent, such as the aqueous suspension of sensitized erythrocytes, may have been titered very carefully, the use of droppers and vials is not only expensive, but is likely to result in questionable findings because of the limitations in the accuracy of ordinary droppers. Such droppers are usually uncalibrated, and although the accuracy of the drop size is of great importance, such accuracy is rarely attained and the size of the drops, and their content of reagent is variable and undependable.

In view of the shortcomings of the vial-dropper test methods, it has been proposed in the prior art to carry out agglutination or agglutination-inhibition reactions by depositing a drop of a test reagent on the surface of a slide or cardboard, allowing the drop to be dried, and then applying test liquid thereto to observe the results.

Thus, U.S. Pat. 2,770,572 describes a card for the determination of blood groups which consists of a solid sheet with at least one area carrying the dried residue of a test serum with specific agglutination against red blood corpuscles. In U.S. Pat. 3,074,853 there is disclosed a test card having a plastic coating which is water-wettable and impermeable on which there is deposited a single dried spot of either an antigen or an antibody admixed with a finely divided substance having a contrasting color such as activated carbon against which to view the formation of the precipitate. The antibody or antigen is applied as a suspension by means of a dropper and then dried, and the serum to be tested is applied to the dried test spot by a dropper. This device has the drawback that the test spots are applied by an ordinary dropper, with attendant inaccuracy of amount deposited, and requires the presence of the colored contrast pigment.

U.S. Pat. 3,272,319 describes an immunological test kit utilizing a control card with a relatively non-absorbent surface on which are deposited a dried serum or plasma, and a corresponding control card with deposits of active and inactive serum or plasma to check the antigen suspension used. A blood sample is tested against a spot known to be reactive with the antigen of the disease being checked. Here also the test spots include either the antigen or antibody, but not both on the same card.

There has accordingly existed a need for a simplified immunochemical test slide or card on which there would be present all the reagents necessary for a given test, and to which the body fluid to be tested could be applied, so as to make the result immediately observable by the person making the test.

GENERAL DESCRIPTION OF THE INVENTION

A principal object of the present invention is to provide on a single test slide or card, all the necessary reagents for performing immunochemical or diagnostic tests of the types previously described, in the form of solid, dried, stable spot deposits, accurate in unit content, and containing a predetermined amount of immunochemical test reagent to yield optimal results, and positioned in close proximity to each other, which upon being moistened are reconstituted to the respective test reagents with the liquid to be tested, and then united to form a spot of reaction mixture.

Another object of the invention is to provide a method for the manufacture of said slides or cards which is inexpensive and practical and which does not require elaborate equipment but which may be carried out conveniently for commercial purposes on a large scale. Still another object is to make the reagents for diagnostic testing available in convenient form on a slide or card while at the same time insuring the accuracy of the amounts of reagents present to provide dependable test results. A further object is to provide a person performing a diagnostic test with a simple card or slide on which the reagents are present in close proximity so that the test can be made in situ and the card kept for record purposes. These and other objects and advantages will become apparent as the description proceeds.

The novel test slide and method of its preparation will be principally illustrated with respect to reagents for an immunochemical or diagnostic test for detecting the presence of human chorionic gonadotropin (HCG) in urine, which test is utilized in the diagnosis of pregnancy. However, it will be understood by those skilled in the art that the principles of the invention are not to be regarded as limited thereto, but may be extended to the preparation and provision of test slides and cards incorporating a wide range of immunochemical and test reagents.

In accordance with the present invention, there is provided a test slide or card adapted for the performance and observation of an immunochemical or diagnostic test on the surface thereof, comprising a substantially plane strip of a substrate material having at least one test surface thereof which is substantially insoluble in, impermeable to, non-absorbent to, and wettable by, water, and carrying on said surface at least one circumscribed test area containing at least two deposited solid dried aqueous immunochemical reagents providing respectively a predetermined amount of an antigen adsorbed on a carrier, and an antiserum or an antibody, which upon being moistened with a liquid to be tested are reconstituted to the test reagents, and then are united to form a spot of reaction mixture.

DESCRIPTION OF THE PREFERRED EMBODIMENTS

The nature and method of preparation of the test slides or cards of the invention will be better understood by reference to the accompanying drawings, which illustrate a presently preferred embodiment, but are not to be considered as limiting the invention thereto. In the drawings, FIG. 1 shows a plan view of the upper surface of a test slide having thereon two solid, dried test spots of immunochemical reagents;

FIG. 4 is a plan view of the upper surface of a test slide in which one test reagent is superimposed upon the other;

FIG. 5 is a cross-sectional view of the slide of FIG. 4, taken along the line 5—5;

FIG. 6 is a plan view of the test slide of FIG. 1 enclosed in an aluminum foil protective container; and FIG. 7 is a cross-sectional view of the slide and container of FIG. 6, taken along the line 7—7.

Figure 1:
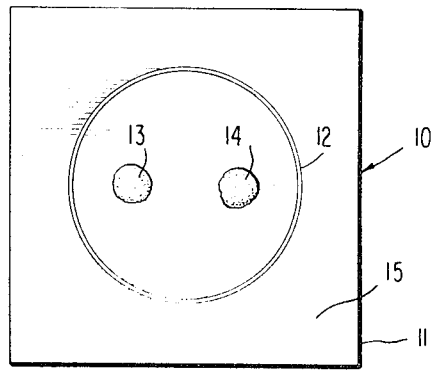

Referring now to the drawings, FIG. 1 shows a test slide suited for the performance of a test for pregnancy. The slide 10 comprises a substantially rectangular sheet or strip of substrate material 11 having the impermeability toward water and wettability referred to previously. The substrate material may, for example, be glass, glazed porcelain, or a synthetic material, e.g. a plastic material such as a phenol-formaldehyde resin the surface of which has been treated so as to make it wettable, for example, by sand blasting or rubbing with an abrasive, or a transparent plastic such as nitro cellulose or methyl methacrylate.

In the embodiment shown in FIG. 1, the substrate is a thin sheet of cardboard having one or both surfaces coated with a coating 15 of a water-impermeable and water-wettable coating of plasticized nitrocellulose, having a thickness which will maintain the flexibility of the cardboard, e.g. about 0.02 inch. In all cases, the surface of the substrate which carries the test reagent areas should be water-insoluble.

The test card 10 bears on its coated surface a circle 12 of contrasting color, which serves to demarcate the location of the area containing the test reagents. In the embodiment shown in FIG. 1, there are two test reagents. The first of these, designated 13, is a solid dried spot of an antigen suspension, for example a dried aqueous suspension of carrier particles such as polystyrene latex, bentonite particles, cholesterol, quartz crystals, erythrocytes and stroma (cell walls) thereof, sensitized with human chorionic gonadotropin. The second test reagent, designated as 14, is a dried antibody, such as a dried human gonadotropin antiserum. These test reagents or spots advantageously have an average diameter between about 5 and about 15 mm., and are located in close proximity, in order that both may be wetted by the liquid to be tested when this is applied to the slide. If desired, the coating 15 may be pigmented with a dark pigment such as carbon black, in order to provide a background of contrasting color against which the test results may be better observed, and which color differs from that of the demarcation circle so as to maintain the visibility of the latter.

In an alternative embodiment, shown in FIGS. 4 and 5, the respective test reagent deposits or spots may be superimposed one on the other. In such cases, it is desirable to provide an intermediate layer of an inert material such as sucrose or mannitol between the respective deposits. Thus, in the embodiment shown in FIGS. 4 and 5, the test card 10 bears on its surface the dried spot of antigen suspension 13, an intermediate layer of sucrose 16 above spot 13, and a layer 14 of dried antiserum superimposed upon intermediate layer 16.

Where the substrate is glass, the test results may readily be studied under suitable magnification.

Figure 2:
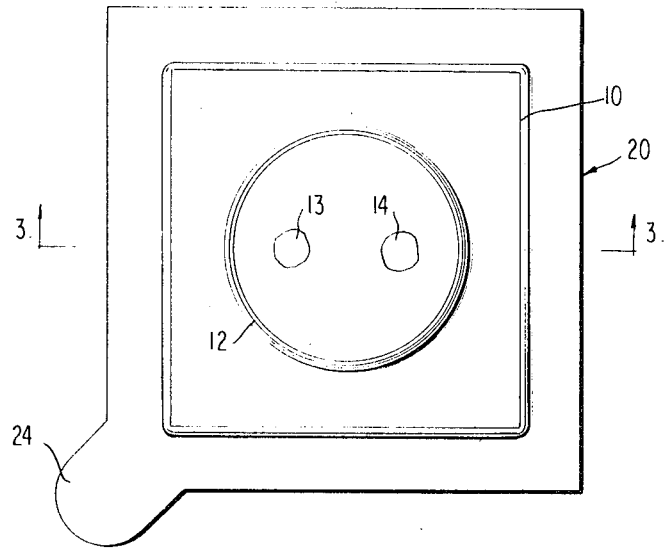
FIG. 2 is a plan view of the test slide of FIG. 1 enclosed in a protective container.
Figure 3:
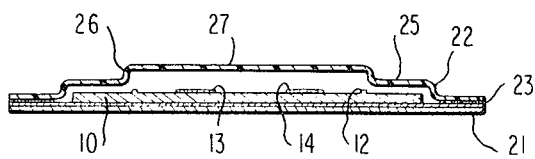
FIG. 3 is a cross-sectional view of the slide and container of FIG. 2, taken along the line 3—3.

FIG. 2 illustrates an arrangement whereby the test slide of FIG. 1 is enclosed within a protective container 20 in order to protect the test spots against moisture and contamination during periods of storage and prior to use. Any suitable type of container may be employed, for example, a plastic bag or envelope. In the embodiment shown, the container comprises a base sheet of aluminum foil-paper laminate 21, and a cover member 22, which is advantageously made of thin transparent plastic material, and which is releasably bonded along the edges to the opposing edge portions of the base sheet, to the aluminum surface of the laminate, as indicated at 23. A tab 24 is provided to enable the user to initiate the release, and to strip off the cover member. Cover member 22 is embossed to provide a raised central portion 25 which is co-extensive with the area of the substrate and which merges into a circular upstanding wall 26, which merges into a central transparent circular panel portion 27, having approximately the same diameter as the aforementioned demarcation circle 12.

FIGS. 6 and 7 illustrate an alternative embodiment wherein the test slide is enclosed in a package 30 fabricated of two sheets 31 and 32 made of metal foil such as aluminum foil or of metal foil laminate such as aluminum foil-plastic laminate material, the package being heat sealed or bonded with adhesive 33 around the peripheral margin 34. The package is formed by coating the edge portions of aluminum foil with a solution of a suitable adhesive, such as a vinyl resin e.g. polyvinyl chloride, a butadiene-acrylonitrile copolymer, polyethylene, or other plastic material conventionally used for bonding metal foil, followed by heat sealing. Where aluminum or other metal foil-plastic laminate material is employed, the package is formed by superimposing the plastic face of the sheets comprising a readily sealable adhesive film such as polyethylene, and heat sealing to provide a hermetic seal for the package. In the filling and bonding or heat sealing operations, which are preferably performed under sterile conditions, the individual slide should be deposited on the bottom metal foil sheet in such position that it is sufficiently away from the sealing portions so as not to be affected by the heat of the sealing operation. It will be understood that a series of slides may be deposited on a lower metal foil web and an upper metal foil web bonded or sealed to the lower web at suitable intervals so as to provide a continuous series of packages which may be separated by a suitable tear line provided between adjacent envelopes.

It will also be understood that within the scope of the invention more than two test deposits or spots may be provided, depending upon the type of immunochemical reaction to be performed.

The preparation of the test reagents which when dried form the test deposits or spots on the slide or card is described in the accompanying examples.

In performing a diagnostic test, such as, for example, a pregnancy test, with the embodiment shown in FIG. 1, a measured amount of the body fluid to be tested, such as urine, is placed on each of the spots of dried reagents, or else placed within the area between the spots. Both spots of dried reagent are then dissolved in or suspended in the urine and mixed by stirring with a toothpick, glass rod or plastic stirring device, so as to unite the reagents to a single spot of reaction mixture in which the immunochemical reaction takes place.

The presence or absence of human chorionic gonadotropin in the urine is detected by agglutination or the inhibition of agglutination of the carrier particles, the reaction being manifested within a few minutes. Similar agglutination or inhibition of agglutination, or precipitation, is to be observed in the case of other types of immunochemical reagents and test liquids.

In the preparation of the test slides or cards, the reagents are constituted as solutions or suspensions in a volatile liquid medium, advantageously an aqueous medium. Such solutions or suspensions may also contain potentiating or resuspending aids. It has been found, in accordance with the invention, that a number of adjuvants contribute to the ease of resuspension of the dried reagents and serve to produce a firm bonding of the dried reagent to the test slide surface. These reagents include, for example, bovine serum albumin in concentration up to and including 5% (wt./vol.), 1% being optimal; lactalbumin hydrolysate in concentrations up to and including 5%, 1% being optimal; and gum arabic in concentration of about 0.5%.

It has also been found, in accordance with the invention, that the inclusion of a saccharide, such as sucrose or mannitol in the reagent provides, upon drying, a hard, glaze-like finish to the dried test spot which protects it against abrasion and mechanical damage, thereby aiding in packing and storage.

As mentioned previously, it is an important aspect of the invention that quantitatively accurate amounts of the reagents be applied to the slide, in order to provide optimal sensitivity to the test, in advance. This obviates the inaccuracy of the conventional test methods which employ medicine dropper dispensing of test reagents.

The following examples, which are to be regarded as illustrative, and not as limiting, show the preparation of various test reagents, particularly those used for pregnancy testing, as described above.

EXAMPLE 1

Latex agglutination inhibition

Polystyrene latex particles having a particle size range of about 0.1 to about 1.5 microns (average 0.5) serving as a carrier are sensitized with 100 I.U. per ml. human chorionic gonadotropin (HCG) and suspended in a borate buffer, and bovine serum albumin is added thereto a concentration of 1% (wt./vol.). The latex is sensitized with HCG by first treating the latex with bovine serum albumin (approximately 90 micrograms per ml.), centrifuging, and incubating the latex with a solution of HCG. Excess HCG is removed by centrifuging and washing, and then the latex is suspended in the buffer. To prepare 100 ml. latex suspension, there are used 24 ml. of 10% HCG-sensitized latex suspension in a buffer containing per 100 ml. water: 0.867 g. boric acid, 0.2 g. NaCl, 0.648 ml. 5 N-NaOH, and 4.0 g. sucrose; the pH is adjusted to 8.2 with NaOH or HCl.

HCG antiserum is prepared by dissolving an appropriate amount (determined by prior titration) of anti-HCG serum (from rabbit), in the following buffer mixture: per 100 ml., 0.4365 g. boric acid, 0.1 g. NaCl, 0.234 ml. 5 N-NaOH, 6 g. sucrose, 0.5 g. bovine serum albumin, N-rabbit serum 0.5 ml., Na citrate dihydrate 4 g.; the pH is adjusted to 8.2 with NaOH or HCl.

An appropriate quantity (0.03 ml.) of each reagent is accurately measured, as described below, onto a circumscribed area on a test slide, to form two separate spots in close proximity. The reagents are then dried in air or by air blast. A pregnancy test is performed by placing one drop (0.03 ml.) of urine on each of the test spots and dissolving or suspending the reagents therein, and mixing the reagents to form one spot in which the reaction takes place, to obtain a visual indication of agglutination or inhibition of agglutination. By regulating the amount of dried reagents presented, the sensitivity of this test can be set at any desired level from about 500 I.U. HCG per liter of urine upwards.

The manner in which the accurately dispensed quantities of immunochemical reagents are applied to the slides and cards, in accordance with the present invention, is to employ a metering pump of suitable type, e.g. a Lambda pump, which is a solenoid-operated piston type pump, made of stainless steel, which will deliver from 0.01 cc. (10 lambda) to 0.5 cc. per stroke, preferably 0.03 cc. The pressure of the issuing suspension or solution is kept below a level which will cause splashing, for example, one drop per stroke, generally 10 strokes per second or less, depending on the rate of delivery desired.

Where two reagents are applied to the slide, they may be each dispensed as a single accurately measured drop side by side simultaneously. The substrate is then removed to a drier and the drops dried at 20° to 70° C. depending upon the heat resistance of the reagent. Vacuum drying may also be employed. Freeze drying is undesirable because the dried spots become soft and friable. The dry slide can be used as such, or provided with the protective container for storage.

EXAMPLE 2

Direct latex agglutination

Rheumatoid factors can be detected in human serum by means of a well known test using human gamma globulin affixed to a latex particle. In this test when the thus sensitized latex particle is brought into contact with human serum containing rheumatoid factors, an agglutination of the sensitized latex particle results. Polystyrene latex particles, 1.5% solids are suspended in a pH 8.6 glycine buffer of the following composition. They are sensitized with human immunoglobulin (IgG) (see Singer and Plotz, Amer. J. Med. 21:888, 1956) and are made one percent with respect to bovine serum albumin. 0.03 ml. drops are measured onto slides and dried.

Glycine (aminoacetic acid)—9.45 gm.
Sodium chloride—12.23 gm.

Dissolve in 800 ml. distilled water and adjust pH to 8.6 with 1 N NaOH. Add distilled water to 1 liter total volume.

Simultaneously to the dispensing of the drop of latex suspension onto the slide, a drop of glycine buffer of the same composition as given is dried onto the slide in a position immediately adjacent to but separate from the drop of latex suspension.

To test for rheumatoid factor in human serum the serum is diluted 1:20 with 0.9% saline or with glycine buffer (previously described) and one drop (0.03 ml.) is measured onto the dried buffer spot. One drop of water (0.03 ml.) is added to the latex spot to reconstitute this reagent. The diluted, buffered serum and latex are mixed and spread over the circumscribed area delineated on the slide. Rheumatoid factor is demonstrated by an agglutination of the particles within one minute.

EXAMPLE 3

Dried particulate antigenic substance

A known test for detection of infectious mononucleosis (I.M.) antibodies in the serum or blood of humans is: I.M. antibodies react with and cause to agglutinate sheep erythrocytes and/or sheep erythrocyte particulate extract. This particulate extract, when dried on a suitable surface with adjuvants can be reconstituted with water or a buffered solution or directly with the test serum. A visible agglutination in the presence of I.M. antibodies present in the serum is diagnostic for infectious mononucleosis if in addition a dried spot of guinea pig tissue extract is also present. The purpose of the guinea pig extract is to absorb non-specific heterophile antibodies of the Forssman type which would otherwise also agglutinate the sheep erythrocyte reagent.

Sheep erythrocyte particulate is prepared by incubation of freshly drawn washed sheep erythrocytes in a borate buffer of the following composition:

Boric acid—30 gm.
Sodium chloride—12 gm.
Sodium hydroxide solution—5 N—about 8 ml. (q.s. to pH 7.0)
Distilled water—1000 ml.
Sodium azide—2 gm.

The resultant suspension is dyed with trypan blue 0.2 gm. per liter dissolved in buffer of the above composition; then the mixture is made one percent with respect to bovine serum albumin.

The guinea pig antigen is prepared as follows: Guinea pig tissue rich in Forssman antigen (i.e., kidney, spleen, lung) is blended in sufficient 0.9% sodium chloride solution to make an 18% suspension. This suspension is clarified by centrifugation, incubated for 30 minutes at 56° C., recentrifuged and made 0.2% with respect to sodium azide.

One drop (0.03 mg.) each of the sheep erythrocyte suspension and the guinea pig tissue extract are placed in close proximity on a suitable slide and air dried. To perform the test one drop (0.06 ml.) of serum, plasma or fresh whole blood is placed onto these dried reagents and the mixture gently stirred to dissolve and/or suspend the reagent in the serum, plasma or blood. An agglutination evidenced by the appearance of blue specks is a positive test. Alternatively, the sheep reagent may be first be reconstituted with a drop of buffer or water then followed by a drop of the serum, plasma or blood.

Alternatively one reagent, preferably the guinea pig tissue extract may be superimposed on the dried drop of the sheep erythrocyte suspension. Some dissolution of the dried sheep reagent will occur in the second drop superimposed on it. To minimize this, a sugar such as sucrose may be added to the first reagent in quantity from about 7 to 10 percent (weight/volume). This dried drop then yields a smooth, hard surface and if the superimposed drop is dried quickly then dissolution of the reagents from the first drop into the second is minimized.

EXAMPLE 4

Direct agglutination of an antibody by dried particulate antigen

Whole preserved, glutaraldehyde- or formaldehyde-treated human erythrocytes of known blood group type are dried on wettable, non-absorbent plane surfaces as previously described. Agglutination with human serum or plasma is diagnostic of the donor's blood type. Freshly drawn human erythrocytes of known blood group specificity are washed with 0.15 M sodium chloride, packed by centrifugation, chilled to 4° C. then suspended to 1 to 2% in a solution of 25% (v./v.) glutaraldehyde diluted to 1% with a solution containing nine volumes of 0.15 M sodium chloride and one volume of 0.15 M sodium phosphate, pH 8.2 and five volumes of distilled water.

The fixed cells are collected by centrifugation and washed with a 0.15 M sodium chloride five times and finally suspended to 30% with distilled water and 1:10,000 thimerosal for storage. (Reference: Bing, D. H. et al., Proc. Soc. Exp. Biol. & Med. 124: 1166–1170 (1967).)

One drop (0.03 ml.) of human A cells prepared as described and on the same slide on an adjacent area one drop (0.03 ml.) of human B cells are dried by means of warm air current. On each dried spot place one drop of serum or plasma to be tested for blood group and suspend the dried cells by mixing each. Agglutination of these suspended cells of known type demonstrates the presence of antibodies to that blood group substance. By the presence or absence of agglutination with either A cells and/ or B cells the blood type of the donor of the serum (or plasma) is readily determined.

EXAMPLE 5

Direct agglutination of a particulate antigen by dried antiserum

Antiserum may be dried on a wettable non-absorbent surface and dissolved in or dissolved and then reacted with a particulate antigen. Human anti-blood group substance can be dried on a glass slide (or other suitable surface) and reacted with and caused to agglutinate the corresponding erythrocytes from whole human blood or saline-washed and suspended human erythrocytes.

Serum or plasma containing antibodies to known blood group substance, i.e., commercial typing serum, can be dried on slides as reagents for blood group typing.

A drop (0.03 ml.) of antiserum to blood group substance A and a drop (0.03 ml.) of antiserum to blood group substance B are dried on adjacent areas on a slide with the aid of a warm air current. To each spot is added a drop of a 1%–2% suspension of human erythocytes to be typed and the resultant suspension is rocked gently for two minutes. An agglutination is evidence that the erythrocytes are of corresponding type to that of the agglutinating antiserum.

Also, freshly drawn blood from a finger tip puncture can be placed directly on the dried spots of reagents on the slide and appropriately diluted with a drop of saline. If the blood contains erythrocytes isologous to the dried antiserum then a readily visible agglutination will ensue.

What is claimed is:

1. A test slide adapted for the performance and observation of an immunochemical or diagnostic test on the surface thereof, comprising a substantially plane strip of a substrate material having at least one test surface which is insoluble in, impermeable to, non-absorbent to, and wettable by, water, and carrying on said surface at least one demarcated circumscribed test area including in close proximity to each other at least two deposited solid dried aqueous immunochemical test reagents, providing respectively a predetermined amount of an antigen adsorbed on a carrier, and an antiserum or antibody, which upon being moistened with a liquid to be tested, are reconstituted to said test reagents, and then are united to form a spot of reaction mixture.

2. The test slide of claim 1 in which said deposited test reagents have an average diameter between about 5 and about 15 millimeters.

3. The test slide of claim 1 in which said substrate material is glass.

4. The test slide of claim 1 in which said circumscribed test area including said test reagents is demarcated by a circle of contrasting color.

5. The test slide of claim 1 in which said substrate carrying the test reagent is enclosed within a protective container comprising a base sheet of metal foil-paper laminate and a cover member comprising an embossed layer of a thin transparent plastic sheet which is releasably edge-bonded to the metal surface of said base sheet, said plastic cover sheet having a central raised portion which is co-extensive with said substrate and which merges into a circular upstanding wall portion which merges into a central circular transparent panel.

6. The test slide of claim 1 in which there is included in said test area a solid dried buffer composition in close proximity to a test reagent deposit.

7. The slide of claim 1 in which said deposited reagents contain a saccharide.

8. The slide of claim 1 in which said deposited reagents include an adjuvant to bind the deposit to the surface and to promote resuspension upon moistening.

9. The test slide of claim 1 which is enclosed within a protective container comprising a base sheet of metal foil and a co-extensive cover sheet of metal foil bonded to said base sheet around the periphery of said sheets to provide a hermetic enclosure for said test slide.

10. The test slide of claim 1 in which said test reagents are positioned on the slide surface side by side in close proximity.

11. The test slide of claim 10 in which one test reagent is superimposed upon the other.

12. The test slide of claim 1 in which said substrate material is a substantially rectangular sheet of cardboard carrying on one surface a coating of a water-impermeable and water-wettable synthetic material.

13. The test slide of claim 12 in which said synthetic material is a thin layer of plasticized nitro cellulose.

14. A test slide adapted for the performance and observation of an immunochemical or diagnostic test on the surface thereof, comprising a substantially rectangular sheet of cardboard coated on at least one surface thereof with a coating of a water-impermeable, water-insoluble, and water-wettable synthetic material to provide a test surface, carrying on said surface a circle of contrasting color to form a circumscribed test area, and having within said circle a first test reagent consisting of deposited solid dried carrier particles sensitized with an antigen, and a second test reagent consisting of a deposited solid dried aqueous solution of an antibody, said test deposits being in close proximity, each test reagent deposit providing a predetermined amount of test reagent, said deposits upon moistening with a liquid to be tested, being reconstituted to the respective reagents and then united by said liquid to form a spot of reaction mixture.

15. The slide of claim 14 in which said deposited reagents contain a saccharide.

16. The slide of claim 14 in which said reagents include an adjuvant to bind the deposit to the surface and to promote resuspension upon moistening.

17. The test slide of claim 14 which is enclosed within a protective container comprising a base sheet of metal foil-paper laminate and a cover member comprising an embossed layer of a thin transparent plastic sheet which is releasably edge-bonded to the metal surface of said base sheet, said plastic cover sheet having a raised central portion which is co-extensive with said slide and which merges into a circular upstanding wall portion which merges into a central circular transparent panel which is approximately the diameter of said circumscribed test area.

18. The test slide of claim 14 which is enclosed within a protective container comprising a base sheet of metal foil and a co-extensive cover sheet of metal foil bonded to said base sheet around the periphery of said sheets to provide a hermetic enclosure for said test slide.

19. A test slide adapted for the performance and observation of an immunochemical test for the diagnosis of pregnancy on the surface thereof, comprising a substantially rectangular sheet of cardboard coated on at least one side with a coating of a water-impermeable, water-insoluble, water-wettable synthetic material to provide a test surface, carrying on said surface a circle of contrasting color to form a circumscribed test area, and having within said circle a first test reagent consisting of a deposited solid dried aqueous suspension of carrier particles sensitized with human chorionic gonadotropin, and a second test reagent consisting of a deposited solid dried solution of human chorionic gonadotropin antiserum, said test reagent deposits being in close proximity, each test reagent deposit providing a predetermined amount of test reagent, said deposits upon moistening with a liquid to be tested being reconstituted to the respective reagents and then united by said liquid to form a spot of reaction mixture.

20. The test slide of claim 19 which is enclosed within a protective container comprising a base sheet of metal foil and a co-extensive cover sheet of metal foil bonded to said base sheet around the periphery of said sheets to provide a hermetic enclosure for said test slide.

References Cited
UNITED STATES PATENTS 3,502,437   3/1970   Mass _____ 23—230 B X MORRIS O. WOLK, Primary Examiner R. M. REESE, Assistant Examiner U.S. Cl. X.R.

23—230 B; 424—12